(12) United States Patent
Furuuchi et al.

(10) Patent No.: US 10,857,918 B2
(45) Date of Patent: Dec. 8, 2020

(54) SEAT-COVER FITTING STRUCTURE

(71) Applicants: NIFCO INC., Yokosuka (JP);
 TACHI-S CO., LTD., Akishima (JP)

(72) Inventors: Suguru Furuuchi, Yokosuka (JP);
 Takao Tsutsui, Akishima (JP);
 Tsutomu Fujikake, Akishima (JP)

(73) Assignees: NIFCO INC., Yokosuka (JP);
 TACHI-S CO., LTD., Akishima (JP)

( * ) Notice: Subject to any disclaimer, the term of this patent is extended or adjusted under 35 U.S.C. 154(b) by 36 days.

(21) Appl. No.: 16/227,689

(22) Filed: Dec. 20, 2018

(65) Prior Publication Data

US 2019/0193613 A1 Jun. 27, 2019

(30) Foreign Application Priority Data

Dec. 22, 2017 (JP) .................. 2017-246474

(51) Int. Cl.
 *B60N 2/58* (2006.01)
 *B60N 2/60* (2006.01)
 *A47C 31/00* (2006.01)
 *A47C 31/02* (2006.01)

(52) U.S. Cl.
 CPC ......... *B60N 2/5841* (2013.01); *B60N 2/5825* (2013.01); *A47C 31/003* (2013.01); *A47C 31/023* (2013.01); *B60N 2/6027* (2013.01); *B60N 2/6045* (2013.01)

(58) Field of Classification Search
 CPC ...... B60N 2/58; B60N 2/5816; B60N 2/5825; B60N 2/5841; B60N 2/60; B60N 2/6018; B60N 2/6027; B60N 2/6045; A47C 31/003; A47C 31/02; A47C 31/023; A47C 31/11
 See application file for complete search history.

(56) References Cited

U.S. PATENT DOCUMENTS

| 6,899,399 | B2 * | 5/2005 | Ali ....................... B60N 2/5825 297/452.6 |
| 7,901,002 | B2 * | 3/2011 | Mashimo ............. B60N 2/5825 297/218.3 |
| 8,882,203 | B2 * | 11/2014 | Takehara ............. A47C 31/023 297/218.2 |
| 10,052,986 | B2 * | 8/2018 | Sato ..................... B60N 2/5825 |

(Continued)

FOREIGN PATENT DOCUMENTS

| DE | 10200501232 A1 * | 9/2006 | ........... B60N 2/5825 |
| DE | 102005012320 A1 * | 9/2006 | ........... B60N 2/5825 |

(Continued)

*Primary Examiner* — Ryan D Kwiecinski
(74) *Attorney, Agent, or Firm* — Sughrue Mion, PLLC

(57) ABSTRACT

Provided is a seat-cover fitting structure capable of preventing a seat cover from accidentally separating from a seat main body. In a seat-cover fitting structure 1, a resin clip 41 that is fitted to an end member 10 attached to the lower end of a hanging cotton-cloth member of a seat cover and a metal clip 50 that is fitted to the exterior of the resin clip 41 engage each other with gaps $X_1$, $X_2$, and $X_3$ formed therebetween. In a state where the metal clip 50 is stuck to, by magnetic force, a main-body-side member that is embedded in the seat main body, the resin clip 41 moves with respect to the metal clip 50 within the ranges of the gaps $X_1$, $X_2$, and $X_3$.

13 Claims, 8 Drawing Sheets

(56) References Cited

U.S. PATENT DOCUMENTS

| | | | |
|---|---|---|---|
| 10,232,749 B2* | 3/2019 | Fujikake | B60N 2/5825 |
| 10,383,407 B2* | 8/2019 | Mahe | A44B 18/0061 |
| 10,414,303 B2* | 9/2019 | Fujikake | A47C 31/11 |
| 2015/0132422 A1* | 5/2015 | Yamada | B29C 31/008 |
| | | | 425/3 |
| 2015/0328808 A1* | 11/2015 | Sasaki | B29C 44/1271 |
| | | | 264/46.4 |
| 2016/0167554 A1* | 6/2016 | Murasaki | A47C 31/023 |
| | | | 297/452.61 |
| 2016/0311352 A1* | 10/2016 | Kheil | B60N 2/5825 |
| 2018/0229634 A1* | 8/2018 | Baisch | B60N 2/5825 |
| 2018/0361895 A1* | 12/2018 | Hoshi | B60N 2/5816 |

FOREIGN PATENT DOCUMENTS

| | | | | |
|---|---|---|---|---|
| DE | 202017106324 U1 * | 5/2018 | | A47C 31/02 |
| EP | 2052905 A2 * | 4/2009 | | B60N 2/5825 |
| EP | 3072734 A1 * | 9/2016 | | B60N 2/5825 |
| FR | 3010012 A1 * | 3/2015 | | A44B 18/0061 |
| JP | 11-113690 A | 4/1999 | | |
| JP | 11113690 A * | 4/1999 | | |
| WO | WO-2010110042 A1 * | 9/2010 | | B60N 2/5825 |
| WO | WO-2016171026 A1 * | 10/2016 | | B60N 2/60 |
| WO | WO-2016171045 A1 * | 10/2016 | | B60N 2/5816 |

* cited by examiner

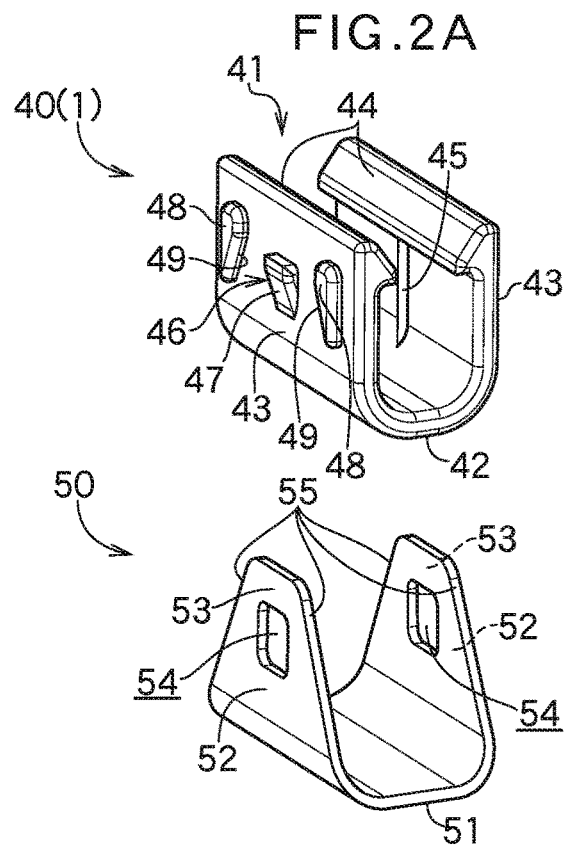
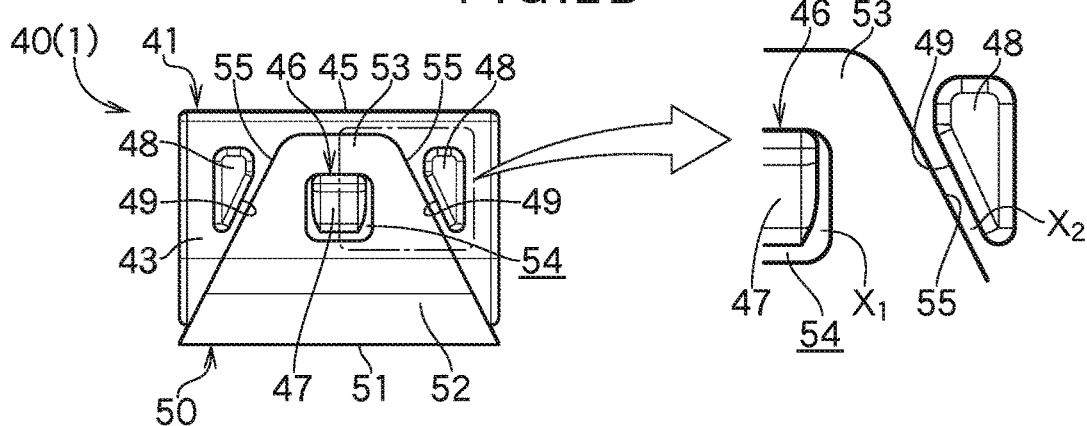
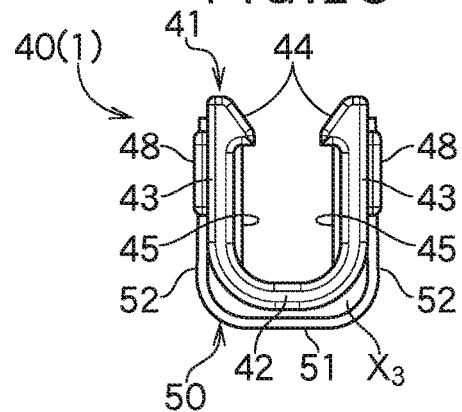

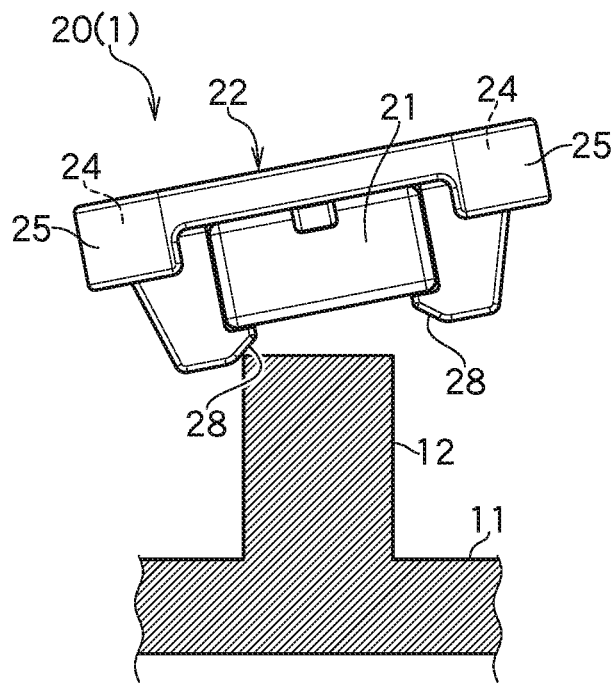
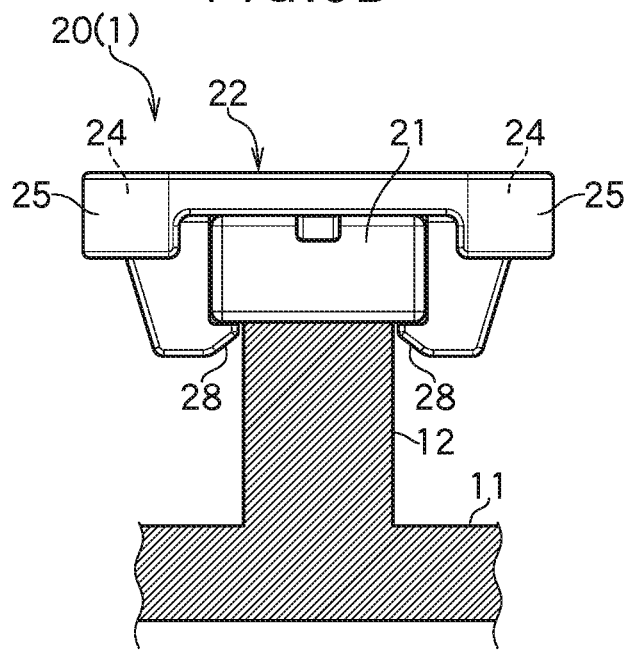

SEAT-COVER FITTING STRUCTURE

BACKGROUND OF THE INVENTION

1. Field of the Invention

The present invention relates to a seat-cover fitting structure for fitting a cover onto, for example, a seat of an automobile or the like.

In the related art, when a seat cover is fitted onto a seat of an automobile or the like, a seat-cover fitting structure described in PLT 1, which will be mentioned below, has been employed. According to the seat-cover fitting structure, a seat cover is attached to a seat main body by magnet clips.

2. Description of the Related Art

[PTL]

PTL 1: Japanese Unexamined Patent Application Publication No. 11-113690

SUMMARY OF THE INVENTION

However, in the seat-cover fitting structure described in PLT 1, as described above, the seat cover is attached to the seat main body by using the magnetic force of the magnet clips, and thus, there is a case where the magnetic clips are separated from the seat cover due to a load that acts on the attached surface.

The present invention has been made in view of such a situation. In other words, it is an object of the present invention to provide a seat-cover fitting structure capable of preventing a seat cover from accidentally separating from a seat main body.

To achieve the above-described object, a seat-cover fitting structure according to the present invention includes a main-body-side member that is embedded in a seat main body, a cover-side first member that is attached to a connecting member, the connecting member being included in a seat cover in order to fit the seat cover onto the seat main body and a cover-side second member that is fitted to an exterior of the cover-side first member. The main-body-side member and the cover-side second member are stuck to each other by magnetic force, and the cover-side first member and the cover-side second member are engaged with each other with a gap formed between the cover-side first member and the cover-side second member.

In the seat-cover fitting structure according to the present invention, an engagement protrusion is formed on one of the cover-side first member and the cover-side second member, and an engagement hole is formed in another one of the cover-side first member and the cover-side second member, the engagement hole having such a size that there is a gap between the engagement hole and the engagement protrusion in a state where the engagement protrusion is inserted in the engagement hole.

In the seat-cover fitting structure according to the present invention, a control protrusion is formed on one of the cover-side first member and the cover-side second member, the control protrusion being brought into contact with an outer edge of another one of the cover-side first member and the cover-side second member in a state where the engagement protrusion is inserted in the engagement hole and is leaning to one side.

In the seat-cover fitting structure according to the present invention, the cover-side first member is a clip that engages an end member attached to an end of the connecting member and that engages the cover-side second member.

In the seat-cover fitting structure according to the present invention, an engagement portion is formed between the end member and the clip.

In the seat-cover fitting structure according to the present invention, the cover-side first member is made of a resin, and the cover-side second member is made of a metal.

In the seat-cover fitting structure according to the present invention, the main-body-side member includes a magnetic member and a bracket that engages the magnetic member, and the bracket includes a guide portion formed in order to guide the main-body-side member to a to-be-mounted portion that is included in a forming mold of the seat main body and on which the main-body-side member is to be mounted.

In the seat-cover fitting structure according to the present invention, the bracket includes a to-be-fitted portion into which the magnetic member is fitted in an entire-length direction of the bracket.

In the seat-cover fitting structure according to the present invention, a fixing hole that is secured to the seat main body and a fixing protrusion that is secured to the seat main body are formed in and on the main-body-side member.

The seat-cover fitting structure according to the present invention includes a main-body-side member that is embedded in a seat main body, a cover-side first member that is attached to a connecting member, the connecting member being included in a seat cover in order to fit the seat cover onto the seat main body, and a cover-side second member that is fitted to an exterior of the cover-side first member. The main-body-side member and the cover-side second member are stuck to each other by magnetic force, and the cover-side first member and the cover-side second member are engaged with each other with a gap formed between the cover-side first member and the cover-side second member. In other words, the gap is formed between the cover-side first member and the cover-side second member in a state where the cover-side first member and the cover-side second member are engaged with each other, so that so-called play is formed. Thus, even in the case where the cover-side first member is moved as a result of a load being applied thereto, the cover-side first member is displaced with respect to the cover-side second member within an acceptable range of the play, which is formed of the gap, and the cover-side second member is kept stuck to the main-body-side member. Therefore, the seat cover can be prevented from accidentally separating from the seat main body.

In the seat-cover fitting structure according to the present invention, an engagement protrusion is formed on one of the cover-side first member and the cover-side second member, and an engagement hole is formed in another one of the cover-side first member and the cover-side second member, the engagement hole having such a size that there is a gap between the engagement hole and the engagement protrusion in a state where the engagement protrusion is inserted in the engagement hole. In other words, there is so-called play between the engagement protrusion and the engagement hole. Thus, even in the case where the cover-side first member is displaced about the engagement protrusion as a result of a load being applied thereto, the cover-side second member is kept stuck to the main-body-side member. Therefore, the seat cover can be prevented from accidentally separating from the seat main body.

In the seat-cover fitting structure according to the present invention, a control protrusion is formed on one of the cover-side first member and the cover-side second member, the control protrusion being brought into contact with an outer edge of another one of the cover-side first member and the cover-side second member in a state where the engagement protrusion is inserted in the engagement hole and is leaning to one side. With this configuration, for example, even in the case where the cover-side first member is inclined about the engagement protrusion, the inclination of the cover-side first member is controlled so as not to exceed a certain level as a result of the engagement protrusion being brought into contact with the outer edge. Therefore, the cover-side first member can be prevented from separating from the cover-side second member.

In the seat-cover fitting structure according to the present invention, the cover-side first member is formed of a clip that engages an end member attached to an end of the connecting member and that engages the cover-side second member. In other words, a configuration for engaging the cover-side second member is realized by the clip, so that molding of the end member and the design of the end member can be simplified. In addition, deterioration of the end member can be prevented, compared with the case where the cover-side second member directly engages the end member, deterioration of the end member may not be prevented. On the other hand, in the case where deterioration of the end member occurs, it is only necessary to replace the clip, and the clip can be easily replaced.

In the seat-cover fitting structure according to the present invention, an engagement portion is formed between the end member and the clip. In other words, the clip is engaged with the end member by the engagement portion. Therefore, the end member can be prevented from being displaced with respect to the clip.

In the seat-cover fitting structure according to the present invention, the cover-side first member is made of a resin, and the cover-side second member is made of a metal. In other words, the cover-side first member made of a resin is covered with the cover-side second member made of a metal, so that plastic deformation of the cover-side first member can be suppressed.

In the seat-cover fitting structure according to the present invention, the main-body-side member includes a magnetic member and a bracket that engages the magnetic member, and the bracket includes a guide portion formed in order to guide the main-body-side member to a to-be-mounted portion that is included in a forming mold of the seat main body and on which the main-body-side member is to be mounted. In other words, when the magnetic member is mounted onto the forming mold of the seat main body, the magnetic member is attracted to the forming mold by magnetic force. Therefore, the main-body-side member can be fixed onto the forming mold without providing a structure for supporting the main-body-side member to the forming mold.

In the forming mold, although it is difficult to cause the magnetic member to stick to an arbitrary position by controlling a magnetic field, positioning of the magnetic member can be performed by using the bracket. In other words, when the magnetic member is attracted together with the main-body-side member by the magnetic force, the main-body-side member can be positioned with respect to the to-be-mounted portion having any structure as a result of being guided along the guide portion.

In the seat-cover fitting structure according to the present invention, the bracket includes a to-be-fitted portion into which the magnetic member is fitted in an entire-length direction of the bracket. In other words, the size of the bracket in a thickness (height) direction of the bracket can be further reduced than that in the case where the magnetic member is fitted in the thickness (height) direction of the bracket. Note that, in the case where the magnetic member is fitted in the thickness (height) direction of the bracket, it is necessary to set the length (height) of a hook for engaging the magnetic member by taking deformation of the hook into consideration.

In the seat-cover fitting structure according to the present invention, a fixing hole that is secured to the seat main body and a fixing protrusion that is secured to the seat main body are formed in and on the main-body-side member. In other words, the interior of the seat main body is formed so as to follow the shape of the fixing hole and the fixing protrusion, so that the interior of the seat main body and the main-body-side member are fitted to each other in a complicated manner with a large contact area. Therefore, the main-body-side member can be firmly fixed onto the seat main body.

BRIEF DESCRIPTION OF THE DRAWINGS

FIG. 2A and FIG. 2B are diagrams illustrating the appearances of a cover-side first member and a cover-side second member in the seat-cover fitting structure according to the first embodiment of the present invention, FIG. 2A and FIG. 2B respectively being an exploded perspective view thereof and an enlarged view of a principal portion thereof, and FIG. 2C is a front view thereof.

FIG. 5A and FIG. 5B are diagrams illustrating a process in which the main-body-side member, which is included in the seat-cover fitting structure according to the first embodiment of the present invention, is mounted onto a to-be-mounted portion of a forming mold, FIG. 5A and FIG. 5B respectively being a schematic diagram illustrating the main-body-side member in the process of being mounted onto the to-be-mounted portion and a schematic diagram illustrating a state in which the main-body-side member has been mounted on the to-be-mounted portion.

DESCRIPTION OF THE PREFERRED EMBODIMENT

Figure 1A:
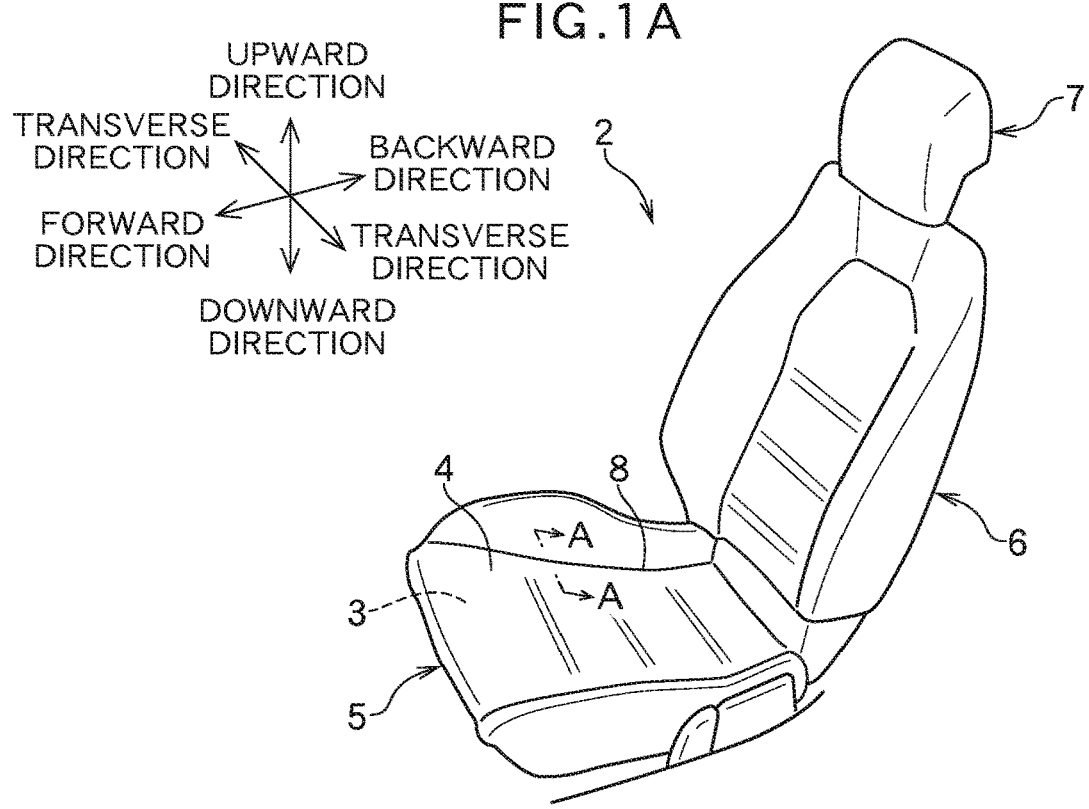
FIG. 1A is an external perspective view of a seat having a seat-cover fitting structure according to a first embodiment of the present invention.
Figure 1B:
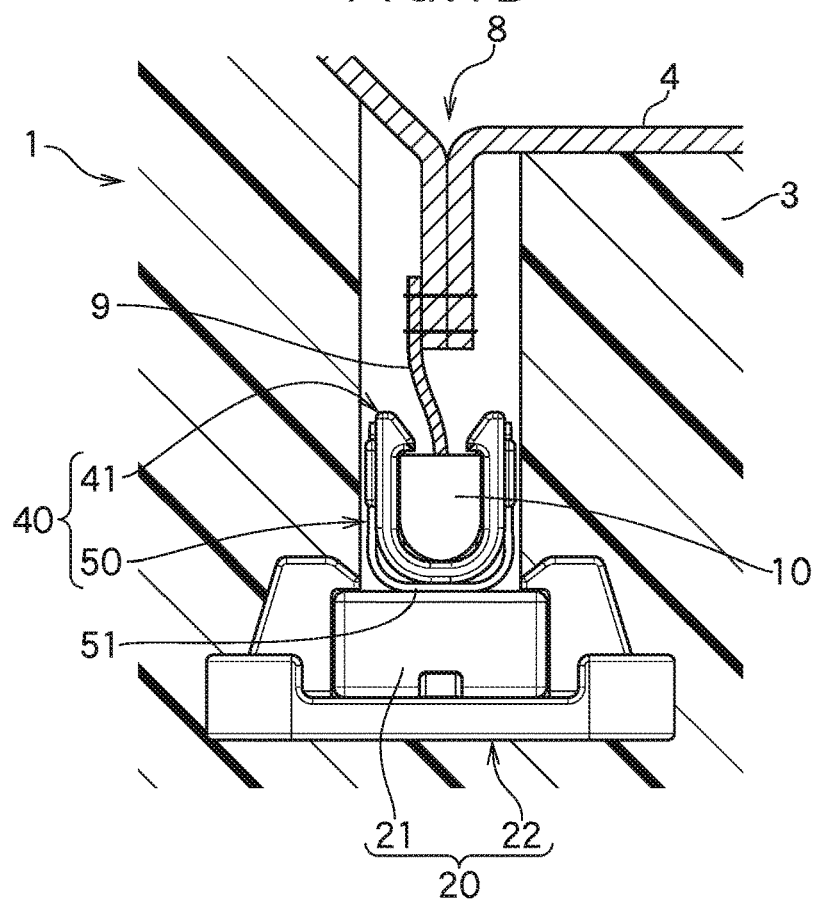
FIG. 1B is an enlarged sectional view of the seat having the seat-cover fitting structure according to the first embodiment of the present invention taken along line A-A of FIG. 1A.
Figure 3A:
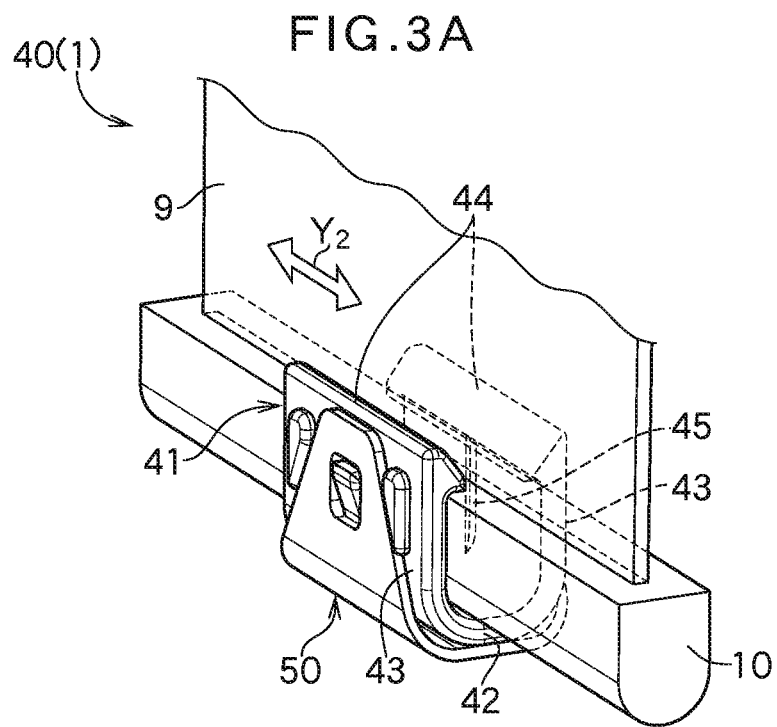
FIG. 3A and FIG. 3B are diagrams illustrating the appearance of the seat-cover fitting structure according to the first embodiment of the present invention in a state in which the cover-side first member and the cover-side second member are attached to a connecting member, FIG. 3A and FIG. 3B respectively being a perspective view thereof and a front view thereof.
Figure 3B:
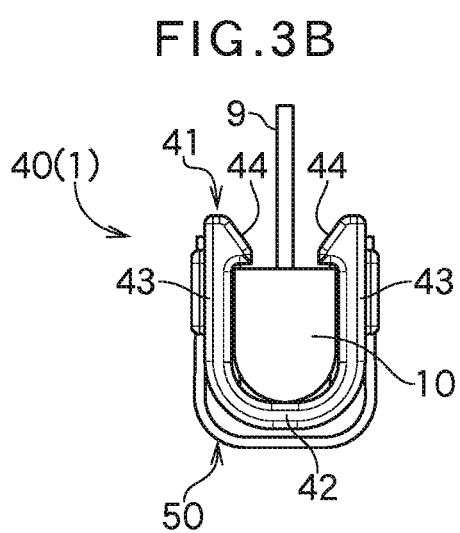
Figure 4A:
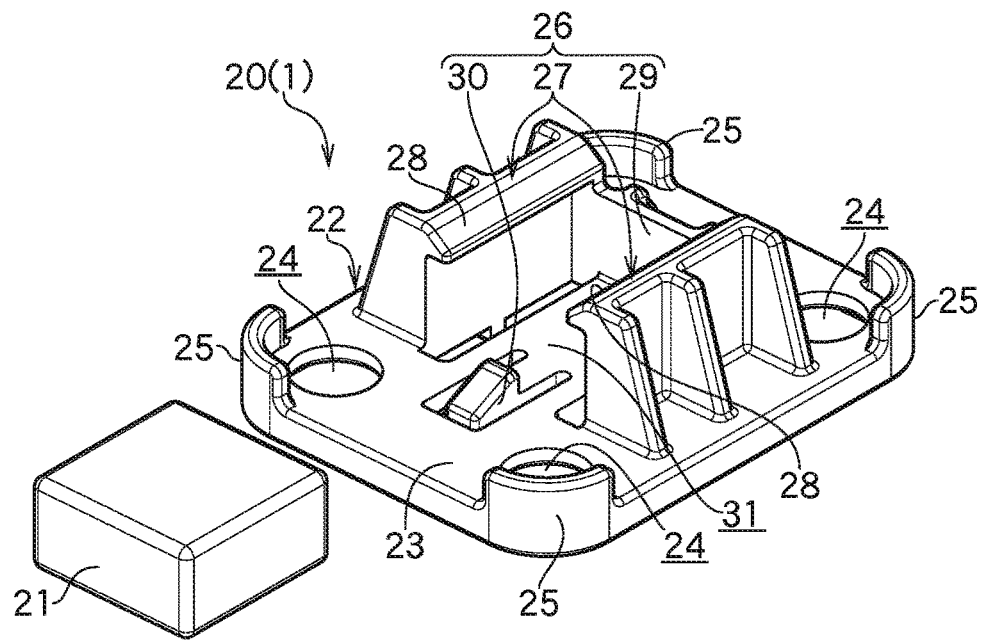
FIG. 4A, FIG. 4B, and FIG. 4C are diagrams illustrating the appearance of a main-body-side member in the seat-cover fitting structure according to the first embodiment of the present invention, FIG. 4A, FIG. 4B, and FIG. 4C respectively being an exploded perspective view thereof, a perspective view thereof, and a front view thereof.
Figure 4B:
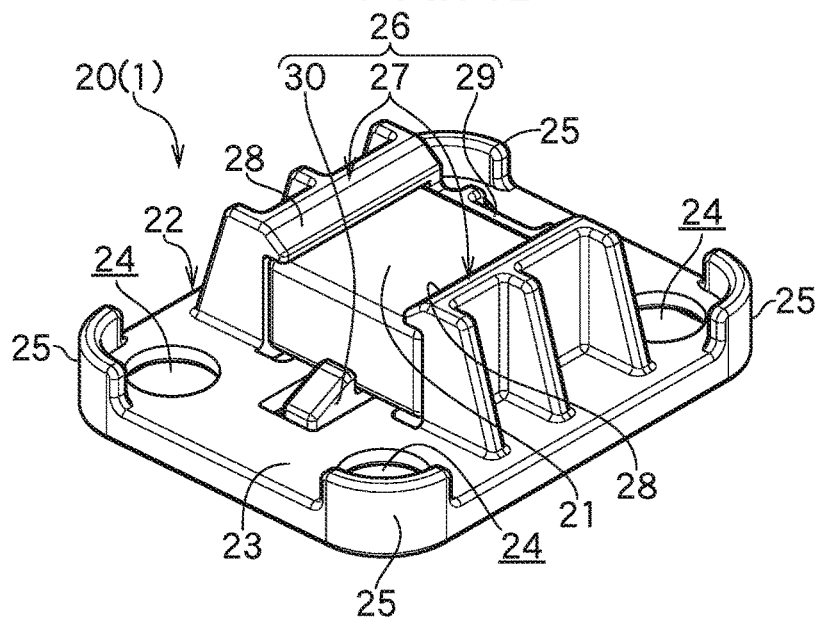
Figure 4C:
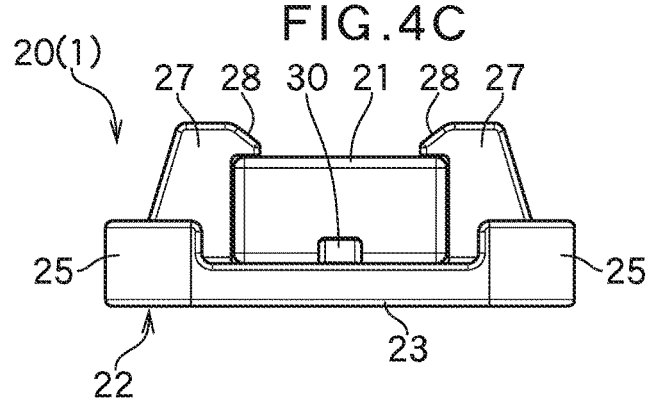

A seat-cover fitting structure according to a first embodiment of the present invention (the seat-cover fitting structure will hereinafter be referred to as "fitting structure") will be described below with reference to the drawings. FIG. 1 illustrates a seat 2 having a fitting structure 1, and FIG. 2 to FIG. 4 illustrate an exploded state of the fitting structure 1. Here, FIG. 2 and FIG. 3 each illustrate a cover-side member 40 included in the fitting structure 1, and FIG. 4 illustrates a main-body-side member 20 included in the fitting structure 1. Note that, in the following description, it is assumed that the seat 2 is installed in an automobile, and as illustrated in FIG. 1, a direction in which the automobile is moved forward and in which a front surface of the seat 2 is oriented will be referred to as a forward direction. A direction in which the automobile is moved backward and in which a rear surface of the seat 2 is oriented will be referred to as a backward direction. A direction in which the width of the automobile extends and in which side surfaces of the seat 2 are oriented will be referred to as a transverse direction. A direction in which the height of the automobile extends and in which the height of the seat 2 extends will be referred to as an upward direction or a downward direction.

As illustrated in FIG. 1, the seat 2 is formed by covering a seat main body 3 with a seat cover 4, which is made of leather or the like, and includes a seat cushion 5, a seatback 6, a headrest 7, and so forth. The seat main body 3 is formed by, for example, foaming and hardening a polyurethane raw material or the like and is molded by using a forming mold 11 that is made of a metal (see FIG. 5). The seat cover 4 is made of, for example, natural leather, artificial leather, synthetic leather, or the like. A hanging cotton-cloth member 9 that serves as a connecting member is sewed on the rear surface side of the seat cover 4. The hanging cotton-cloth member 9 is used for fitting the seat cover 4 onto the seat main body 3.

The fitting structure 1 is employed in grooves 8 of the seat cushion 5 and of the seatback 6 when the seat cover 4 is fitted onto the seat main body 3. More specifically, the fitting structure 1 includes the main-body-side member 20 that is embedded in the seat main body 3 and the cover-side member 40 that is attached to the seat cover 4. The main-body-side member 20 includes a magnetic member 21 and a bracket 22 that engages the magnetic member 21 and is embedded beforehand into the seat main body 3 when the seat main body 3 is molded. The cover-side member 40 includes a resin clip 41 that serves as a cover-side first member and that is fitted to an end member 10, the end ember 10 being attached to a lower end of the hanging cotton-cloth member 9 of the seat cover 4, and a metal clip 50 that serves as a cover-side second member and that is fitted to the exterior of the resin clip 41.

As illustrated in FIG. 2, the resin clip 41 has a substantially U-shape when viewed in the forward and backward directions and is formed to have such a size that the end member 10 is closely fitted in the resin clip 41. More specifically, the resin clip 41 includes a bottom surface portion 42, which is the bottom surface thereof, and a pair of side surface portions 43 that are connected to the two side ends of the bottom surface portion 42 in such a manner as to extend upward and that face each other. The resin clip 41 is made of, for example, a polyacetal or the like.

Upper end engagement portions 44 each having a hook-like shape are formed at the upper ends of the side surface portions 43 in such a manner as to face each other. Beads 45 facing each other and serving as a pair of engagement portions are formed on inner surface portions of the side surface portions 43, which are side surfaces of the side surface portions 43 facing each other. Each of the beads 45 protrudes in a direction in which the beads 45 face each other while having a long linear shape in the upward and downward directions and is formed substantially at the center of a corresponding one of the inner surface portions. Engagement protrusions 46 and control protrusions 48 are formed on outer surface portions of the side surface portions 43, the outer surface portions being surfaces opposite to the surfaces of the side surface portions 43 that face each other. Each of the engagement protrusions 46 is formed substantially at the center of a corresponding one of the outer surface portions and has a protruding inclined surface 47 formed on the outside thereof. The protruding inclined surface 47 is inclined in the transverse direction from the lower side toward the upper side thereof. Each of the control protrusions 48 is formed at a forward or backward position with respect to a corresponding one of the engagement protrusions 46 in such a manner as to be spaced apart from the engagement protrusion 46 and has a control inclined surface 49 that is formed in such a manner as to face the engagement protrusion 46. The control inclined surface 49 is inclined in a direction toward the engagement protrusion 46 from the lower side toward the upper side thereof.

The metal clip 50 has a thin-plate-like shape while being substantially U-shaped when viewed in the forward and backward directions and is formed to have such a size that the resin clip 41 is accommodated in the metal clip 50 with a gap formed therebetween. More specifically, the metal clip 50 includes a bottom plate portion 51, which is the bottom surface thereof, and a pair of side plate portions 52 that are connected to the two side ends of the bottom plate portion 51 in such a manner as to extend upward and that face each other. For example, the metal clip 50 is made of a metal, such as iron, cobalt, or nickel, or an alloy, such as chromium stainless steel. In other words, the metal clip 50 is made of a material that sticks to the magnetic member 21 and acts as a plate spring.

Each of the side plate portions 52 is formed in a substantially trapezoidal shape when viewed in the transverse direction and includes an upper piece portion 53 that is located slightly above the center thereof, and an engagement hole 54 is formed in the upper piece portion 53. The engagement hole 54 has a substantially quadrangular shape and is formed to have such a size that there is a gap $X_1$ between the engagement hole 54 and a corresponding one of the engagement protrusions 46 of the resin clip 41 in a state where the engagement protrusion 46 is inserted in the engagement hole 54.

When the metal clip 50 is fitted onto the resin clip 41, the metal clip 50 and the resin clip 41 are brought relatively close to each other in the upward and downward directions, and the side plate portions 52 of the metal clip 50 face and slide over the outer surface portions of the side surface portions 43 of the resin clip 41. In this case, the upper piece portions 53 of the side plate portions 52 move along the protruding inclined surfaces 47 of the engagement protrusions 46, so that the side plate portions 52 are elastically deformed so as to be gradually opened as the metal clip 50 and the resin clip 41 come closer to each other in the upward and downward directions. When the engagement protrusions 46 of the side surface portions 43 are inserted into the engagement holes 54 of the side plate portions 52, each of the side plate portions 52 returns to its original state by a restoring force, and the resin clip 41 is sandwiched by the side plate portions 52. In this manner, the metal clip 50 and the resin clip 41 engage each other.

In this state, the resin clip 41 and the metal clip 50 engage each other with the gap $X_1$, a gap $X_2$, and a gap $X_3$ formed therebetween. More specifically, in a state where the engagement protrusions 46 are inserted in the engagement holes 54, the gap $X_1$ is formed between each of the engagement protrusions 46 and the corresponding engagement hole 54. The gap $X_2$ is formed between each of the control inclined surfaces 49 of the control protrusions 48 of the resin clip 41 and a corresponding one of outer edges 55 of the upper piece portions 53 of the metal clip 50. The gap $X_3$ is formed between the bottom plate portion 51 of the metal clip 50 and the bottom surface portion 42 of the resin clip 41.

As illustrated in FIG. 3, the end member 10 is caught by a lower end portion of the hanging cotton-cloth member 9 and has a rod-like shape that is long in the forward and backward directions. An outer peripheral surface of the end member 10 is formed in a substantially U-shape, and the lower end thereof is curved so as to follow the shape of the resin clip 41. The end member 10 is made of a resin and manufactured by performing extrusion molding on, for example, polypropylene or the like. Note that the shape of the outer peripheral surface of the end member 10 is arbitrary as long as the end member 10 is closely fitted in the resin clip 41.

When the end member 10 is fitted into the resin clip 41, the end member 10 and the resin clip 41 are brought relatively close to each other in the upward and downward directions, and the side surface portions 43 of the resin clip 41 face and slide over the outer peripheral surface of the end member 10. In this case, the upper end engagement portions 44 of the side surface portions 43 move along the outer peripheral surface of the end member 10, so that the side surface portions 43 are elastically deformed so as to be gradually opened as the end member 10 and the resin clip 41 come closer to each other in the upward and downward directions. When the end member 10 reaches the bottom surface portion 42 of the resin clip 41, each of the side surface portions 43 returns to its original state by a restoring force, and the end member 10 is sandwiched by the side surface portions 43, and each of the upper end engagement portions 44 engages an upper end portion of the end member 10. At the same time, the beads 45 dig into and engage the end member 10. In this manner, the end member 10 and the resin clip 41 engage each other.

Note that the order in which the resin clip 41, the metal clip 50, and the end member 10 are fitted to one another is arbitrary. Thus, as described above, the end member 10 and the resin clip 41 may be engaged with each other after the resin clip 42 and the metal clip 50 have been engaged with each other, or the resin clip 41 and the metal clip 50 may be engaged with each other after the end member 10 and the resin clip 41 have been engaged with each other.

As illustrated in FIG. 4, in the bracket 22, fixing holes 24 and fixing protrusions 25 are formed at four corners of a base portion 23 that is formed in a substantially rectangular shape, and a to-be-fitted portion 26 into which the magnetic member 21 is fitted in an entire-length direction, which is a long-side direction, is formed substantially at the center of the top surface of the base portion 23.

The fixing protrusions 25 are substantially perpendicular to the base portion 23 and protrude upward from the base portion 23. Each of the fixing holes 24 extends through the base portion 23 in the upward and downward directions at a position that is in the vicinity of one of the fixing protrusions 25 and that is further inside than the fixing protrusion 25 is.

The to-be-fitted portion 26 includes a pair of magnetic-member first engagement pieces 27 that protrude upward from the base portion 23 and face each other, a magnetic-member holding piece 29 that is connected to the rear ends of the magnetic-member first engagement pieces 27 in an entire-length direction of the magnetic-member first engagement pieces 27, and a magnetic-member second engagement piece 30 that is formed on the base portion 23 and located on the front end side of the magnetic-member first engagement pieces 27 in the entire-length direction. In addition, in the to-be-fitted portion 26, a to-be-fitted space 31 is formed and defined by the magnetic-member first engagement pieces 27, the magnetic-member holding piece 29, and the magnetic-member second engagement piece 30.

Upper end portions of the magnetic-member first engagement pieces 27 are each formed in a hook-like shape in such a manner as to face each other. The top surfaces of the magnetic-member first engagement pieces 27 include guide portions 28. The guide portions 28 are inclined toward the to-be-fitted space 31 and toward the side on which the guide portions 28 face each other. The magnetic-member second engagement piece 30 is formed on a portion of the base portion 23 on the same plane as the base portion 23 by cutting away a portion of the base portion 23 and is formed in a hook-like shape extending upward. The to-be-fitted space 31 has such a size that the magnetic member 21 is closely fitted therein.

Note that the shape of the base portion 23 is arbitrary and may be, for example, a polygonal shape, such as a square shape or a triangular shape, or a circular shape. In addition, the shapes, the arrangement, and the numbers of the fixing protrusions 25 and the fixing holes 24 are arbitrary.

The magnetic member 21 is a permanent magnet having a rectangular parallelepiped shape and is fitted into the to-be-fitted portion 26 by being slid in an entire-length direction of the bracket 22. More specifically, when the magnetic member 21 is inserted into the to-be-fitted portion 26 until the rear end of the magnetic member 21 is brought into contact with the magnetic-member holding piece 29, the front end of the magnetic member 21 engages the magnetic-member second engagement piece 30. At the same time, the top surface of the magnetic member 21 engages the magnetic-member first engagement pieces 27. Note that the shape of the magnetic member 21 is arbitrary and may be, for example, a cubic shape, a columnar shape, or the like. In this case, the to-be-fitted portion 26 of the bracket 22 is designed so as to have a shape corresponding to the magnetic member 21. However, in order to increase the degree of magnetic sticking force, it is preferable that a contact area between the magnetic member 21 and the bottom plate portion 51 of the metal clip 50 be as large as possible.

The main-body-side member 20 having the above-described configuration is mounted beforehand onto the forming mold 11 of the seat main body 3 in order to be embedded into the seat main body 3. Here, positioning of the main-body-side member 20 with respect to the forming mold 11 will be described with reference to the drawings. FIG. 5 illustrates a process in which the main-body-side member 20 is mounted onto the to-be-mounted portion 12 of the forming mold 11. Note that FIG. 5 illustrates only a portion of the forming mold 11.

As illustrated in FIG. 5, the forming mold 11 includes the to-be-mounted portion 12 that is formed so as to project upward. When the main-body-side member 20 is brought close to the to-be-mounted portion 12, the main-body-side member 20 is attracted to the to-be-mounted portion 12 by the magnetic force of the magnetic member 21. In this case, if the positioning of the main-body-side member 20 with respect to the to-be-mounted portion 12 is performed by using only the magnetic force, the main-body-side member 20 may sometimes be, for example, displaced with respect to the to-be-mounted portion 12 or inclined with respect to the to-be-mounted portion 12, so that the positioning may not be performed accurately. Accordingly, in order to perform the positioning of the main-body-side member 20 with respect to the forming mold 11, the guide portions 28 of the bracket 22 are used. In other words, the guide portions 28 of the bracket 22 come into contact with the to-be-mounted portion 12 and follow the to-be-mounted portion 12, and as a result, the main-body-side member 20 is guided to the to-be-mounted portion 12 and positioned with respect to the to-be-mounted portion 12.

In this state, for example, a polyurethane raw material or the like is poured into the forming mold 11. At that time, the polyurethane raw material is uniformly injected into and onto projections and depressions of the main-body-side member 20 excluding the top surface of the magnetic member 21 (the bottom surface of the magnetic member 21 in FIG. 5), and particularly, the polyurethane raw material is injected into the fixing holes 24 of the bracket 22 and is brought into close contact with the fixing protrusions 25. The polyurethane raw material foams and hardens through a predetermined process, and particularly, the main-body-side member 20 is firmly fixed onto the hardened polyurethane raw material in the vicinity of the fixing holes 24 and the fixing protrusions 25. In this manner, the seat main body 3 in which the main-body-side member 20 has been embedded is formed (see FIG. 1). Note that a space that is formed at the position of the to-be-mounted portion 12 through the formation of the main-body-side member 20 is an insertion path and also an installation space of the cover-side member 40.

In the fitting structure 1 configured as described above, as illustrated in FIG. 1, when the seat cover 4 is fitted onto the seat main body 3, the cover-side member 40 is caused to stick to the main-body-side member 20 by the magnetic force and is mounted onto the main-body-side member 20. More specifically, the bottom plate portion 51 of the metal clip 50, which is included in the cover-side member 40, sticks to the top surface of the magnetic member 21, which is included in the main-body-side member 20.

Note that the metal clip 50 may be made of a magnetic material, and the magnetic member 21 may be made of a metal.

Figure 6:
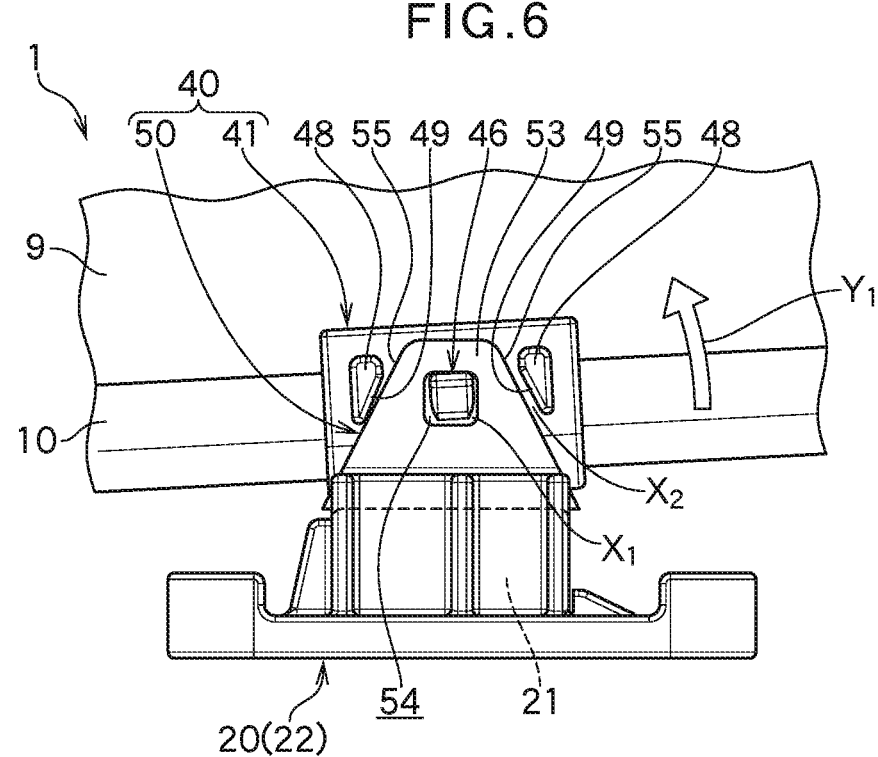
FIG. 6 is a side view of the seat-cover fitting structure according to the first embodiment of the present invention in an operating state.

Advantageous effects of the fitting structure 1 will now be described together with an operating state of the fitting structure 1 and with reference to the drawings. FIG. 6 illustrates the operating state of the fitting structure 1 when viewed in the transverse direction.

As illustrated in FIG. 6, according to the fitting structure 1, the angle of the resin clip 41 of the cover-side member 40 with respect to the main-body-side member 20 changes, or the resin clip 41 of the cover-side member 40 moves with respect to the main-body-side member 20. In other words, when the seat 2 is pressed against the seat main body 3 as a result of, for example, an occupant sitting on the seat 2 or baggage being placed on the seat 2, the seat cover 4 is pulled toward the pressed position, and the hanging cotton-cloth member 9 is pulled. Thus, a load in a direction $Y_1$ away from the main-body-side member 20 is applied to the cover-side member 40. Here, in the resin clip 41 and the metal clip 50, there is the gap $X_1$ between each of the engagement protrusions 46 and a corresponding one of the engagement holes 54 (see FIG. 2(b)). In addition, there is the gap $X_2$ between each of the outer edges 55 of the upper piece portions 53, which is included in the metal clip 50, and a corresponding one of the control inclined surfaces 49 of the control protrusions 48, which is included in the resin clip 41 (see FIG. 2(b)). Furthermore, there is the gap $X_3$ between the bottom plate portion 51 of the metal clip 50 and the bottom surface portion 42 of the resin clip 41 (see FIG. 2(c)). In other words, there is so-called play between the resin clip 41 and the metal clip 50, and thus, even if a load is applied, the resin clip 41 is inclined about the engagement protrusions 46 with respect to the metal clip 50 and moves in the forward, backward, upward, and downward directions within an acceptable range of the play. In this case, the metal clip 50 is kept stuck to the magnetic member 21. Therefore, the seat cover 4 can be prevented from accidentally separating from the seat main body 3.

In addition, as illustrated in FIG. 6, when the resin clip 41 is inclined with respect to the metal clip 50, the engagement protrusions 46 are positioned so as to lean to one side in the corresponding engagement holes 54, and the control inclined surfaces 49 of the resin clip 41 are brought into contact with the corresponding outer edges 55 of the metal clip 50. In other words, the inclination of the resin clip 41 with respect to the metal clip 50 is controlled so as not to exceed a certain level as a result of the control inclined surfaces 49 being brought into contact with the corresponding outer edges 55. Therefore, the resin clip 41 can be prevented from separating from the metal clip 50.

As illustrated in FIG. 1, according to the fitting structure 1, the cover-side member 40 is formed of the resin clip 41 engaging the end member 10, which is attached to the lower end of the hanging cotton-cloth member 9, and the metal clip 50 fitted to the exterior of the resin clip 41. In other words, a configuration for engaging the metal clip 50 is realized by the resin clip 41, so that the molding of the end member 10 and the design of the end member 10 can be further simplified than those in a fitting structure 101 (see FIG. 7) according to a second embodiment, which will be described later. In addition, deterioration of the end member 10 can be prevented, whereas in the fitting structure 101 that does not include the resin clip 41, deterioration of the end member 10 may not be prevented. On the other hand, in the case where deterioration of the end member 10 occurs, it is only necessary to replace the resin clip 41, and the resin clip 41 can be easily replaced.

As illustrated in FIG. 2, according to the fitting structure 1, the pair of beads 45, which face each other, are formed on the inner surface portions of the side surface portions 43 of the resin clip 41. Each of the beads 45 protrudes toward the side on which the beads 45 face each other while having a long linear shape in the upward and downward directions and is formed substantially at the center of the corresponding inner surface portion. With this configuration, as illustrated in FIG. 3, when the resin clip 41 is fitted to the end member 10, the beads 45 dig into and engage the end member 10 between the end member 10 and the resin clip 41. Thus, the end member 10 can be prevented from being displaced with respect to the resin clip 41. In particular, movement of the end member 10 in a thrust direction $Y_2$ with respect to the cover-side member 40 can be suppressed. Note that the length, the shape, the arrangement, and the number of the beads 45 are arbitrary as long as a configuration in which the end member 10 engages the resin clip 41 is employed.

According to the fitting structure 1, the metal clip 50 is made of, for example, a metal such as iron, and in contrast, the resin clip 41 is made of, for example, a resin such as a polyacetal. In other words, as illustrated in FIG. 3, the resin clip 41 made of a resin is covered with the metal clip 50 made of a metal, so that plastic deformation of the resin clip 41 can be suppressed.

As illustrated in FIG. 4, according to the fitting structure 1, in the bracket 22, the to-be-fitted portion 26, into which the magnetic member 21 is fitted in the entire-length direction, is formed substantially at the center of the top surface of the base portion 23. In other words, the size of the bracket 22 in a thickness (height) direction of the bracket 22 can be further reduced than that in the case where the magnetic member 21 is fitted in the thickness (height) direction of the bracket 22.

As illustrated in FIG. 4, according to the fitting structure 1, in the bracket 22, the fixing holes 24 and the fixing protrusions 25 are formed at the four corners of the base portion 23. The fixing protrusions 25 are substantially perpendicular to the base portion 23 and protrude upward from the base portion 23. Each of the fixing holes 24 extends through the base portion 23 in the upward and downward directions at the position that is in the vicinity of the corresponding fixing protrusion 25 and that is further inside than the fixing protrusion 25 is. With this configuration, when the main-body-side member 20 is embedded into the seat main body 3, the polyurethane raw material is injected into the fixing holes 24 of the bracket 22 and is brought into close contact with the fixing protrusions 25. In particular, in the vicinity of the fixing holes 24 and the fixing protrusions 25, the polyurethane raw material that has hardened is fitted to the main-body-side member 20 in a complicated manner with a large contact area, and thus, the main-body-side member 20 is firmly fixed onto the hardened polyurethane raw material. Therefore, the main-body-side member 20 can be firmly fixed onto the seat main body 3. In particular, when the seat cover 4 is pulled, and the main-body-side member 20 is pulled upward, a reaction force generated between the contact surfaces of the main-body-side member 20 and the seat main body 3 can be increased.

As illustrated in FIG. 4, according to the fitting structure 1, in the bracket 22, the guide portions 28 are included in the top surfaces of the magnetic-member first engagement pieces 27. The guide portions 28 are inclined toward the to-be-fitted space 31 and toward the side on which the guide portions 28 face each other. With this configuration, as illustrated in FIG. 5, when the magnetic member 21 is attracted to the forming mold 12 by the magnetic force, the guide portions 28 of the bracket 22 come into contact with the to-be-mounted portion 12 and follow the to-be-mounted portion 12, and as a result, the main-body-side member 20 is guided to the to-be-mounted portion 12 and positioned with respect to the to-be-mounted portion 12. Thus, the main-body-side member 20 can be fixed onto the forming mold 12 without providing a recessed structure for supporting the main-body-side member 20 to the forming mold 12. In addition, the main-body-side member 20 can be positioned with respect to the to-be-mounted portion 12 having any structure by the guide portions 28.

Figure 7:
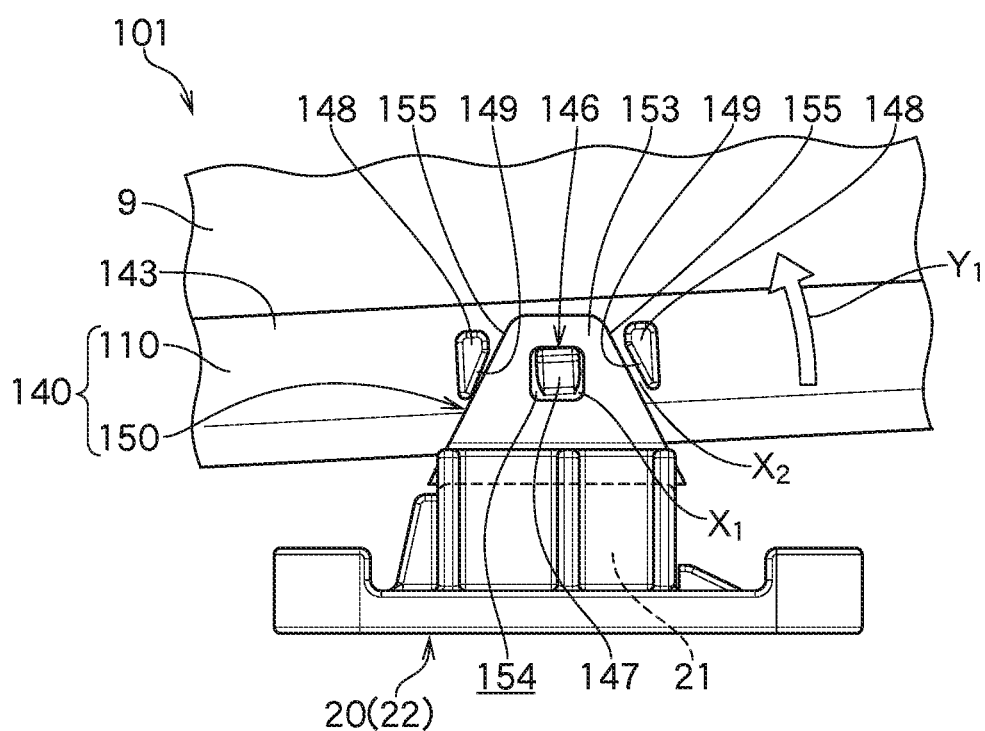
FIG. 7 is a side view of a seat-cover fitting structure according to a second embodiment of the present invention in an operating state.
Figure 8:
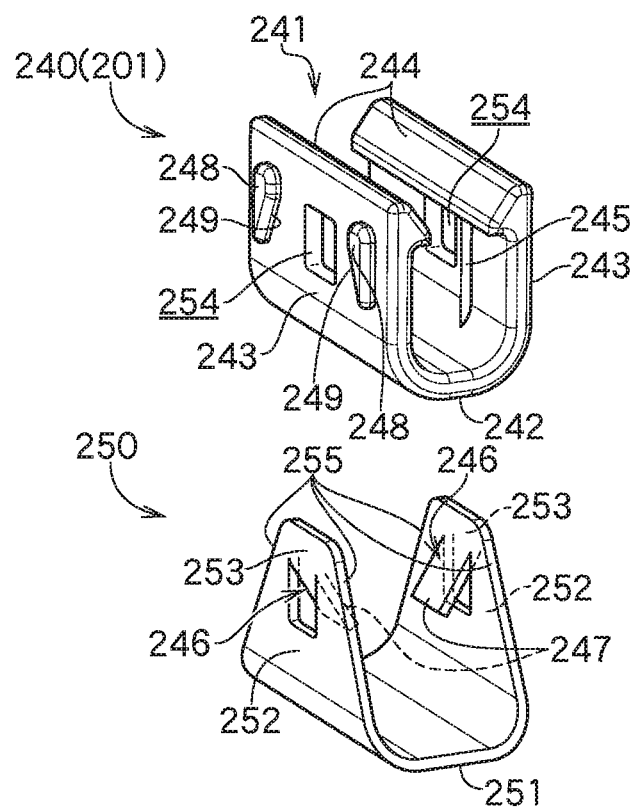
FIG. 8 is an external perspective view of a cover-side first member and a cover-side second member in a seat-cover fitting structure according to a third embodiment of the present invention.
Figure 9:
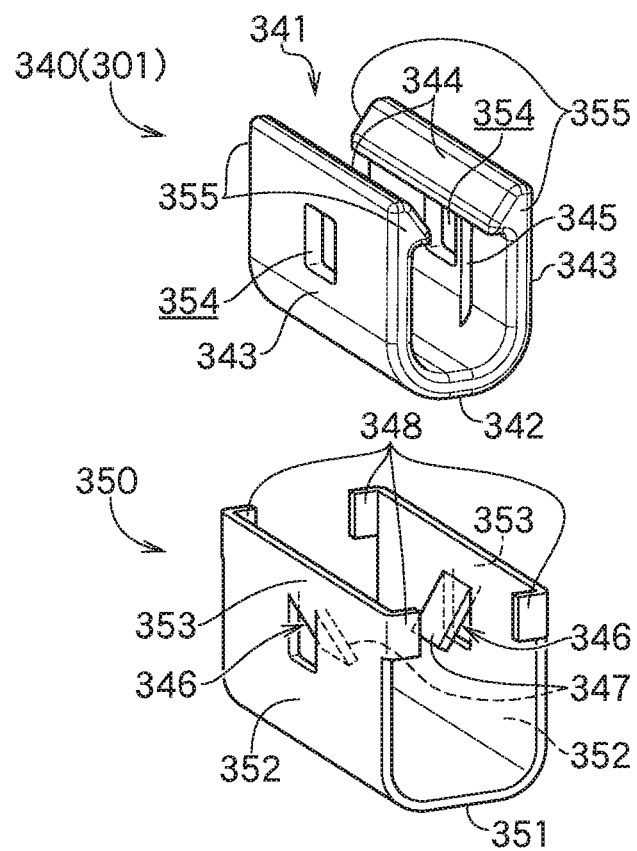
FIG. 9 is an external perspective view of a cover-side first member and a cover-side second member in a seat-cover fitting structure according to a fourth embodiment of the present invention.
Figure 10:
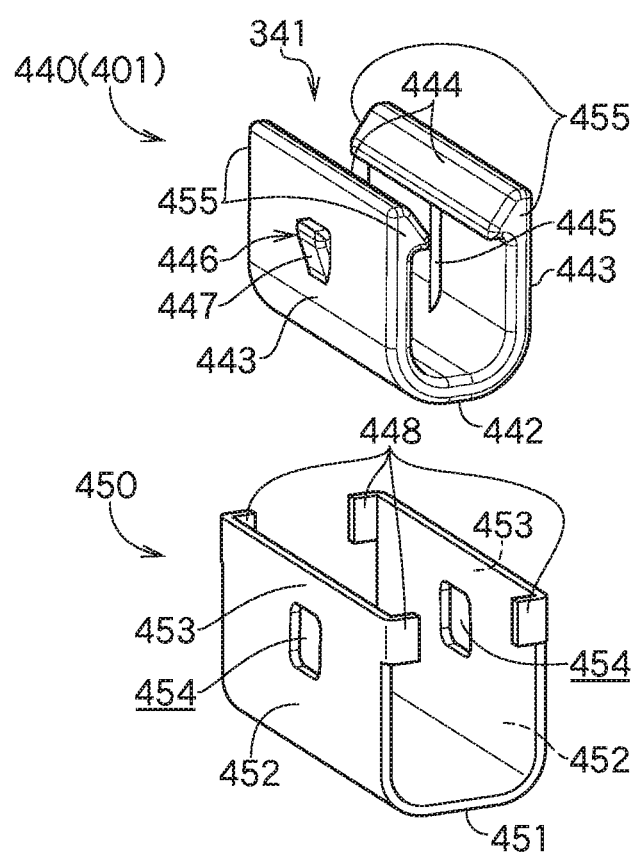
FIG. 10 is an external perspective view of a cover-side first member and a cover-side second member in a seat-cover fitting structure according to a fifth embodiment of the present invention.

Fitting structures 101, 201, 301, and 401 according to the other embodiments will now be described with reference to the drawings. FIG. 7 illustrates the operating state of the fitting structure 101 according to the second embodiment when viewed in the transverse direction. FIG. 8 illustrates a cover-side member 240 included in the fitting structure 201 according to the third embodiment. FIG. 9 illustrates a cover-side member 340 included in the fitting structure 301 according to the fourth embodiment. FIG. 10 illustrates a cover-side member 440 included in the fitting structure 401 according to the fifth embodiment. Note that, in the following description, only a configuration that is different from that of the fitting structure 1 according to the first embodiment will be mainly described, and the description of a configuration that is similar to that of the fitting structure 1 will be suitably omitted by means of illustration.

As illustrated in FIG. 7, differences between the configuration of the fitting structure 101 according to the second embodiment and the configuration of the fitting structure 1 (see FIG. 6) are that, in the configuration of the fitting structure 101, a resin clip and an end member are integrated with each other and that the configuration of the fitting structure 101 includes a protruding end member 110 serving as the cover-side first member.

More specifically, a cover-side member 140 includes the protruding end member 110 that is attached to the lower end of the hanging cotton-cloth member 9 and the metal clip 50 that serves as the cover-side second member and that is fitted to the exterior of the protruding end member 110. Note that the main-body-side member 20 is the same as that in the fitting structure 1.

The protruding end member 110 has a shape similar to that of the end member 10 of the fitting structure 1 according to the first embodiment, and protrusions that are similar to the protrusions formed on the resin clip 41 of the fitting structure 1 are formed on side surface portions 143 of the protruding end member 110. In other words, engagement protrusions 146 and control protrusions 148 are formed on outer surface portions of the side surface portions 143. Note that the rest of the configuration is the same as that of the fitting structure 1.

Although not illustrated, as a modification of the fitting structure 101, engagement holes may be formed in the protruding end member 110, and engagement protrusions and control protrusions may be formed on the metal clip 150. Alternatively, engagement protrusions may be formed on the protruding end member 110, and engagement holes and control protrusions may be formed in and on the metal clip 150. Alternatively, engagement holes and control protrusions may be formed in and on the protruding end member 110, and engagement protrusions may be formed on the metal clip 150.

As illustrated in FIG. 8, differences between the configuration of the fitting structure 201 according to the third embodiment and the configuration of the fitting structure 1 (see FIG. 2) are that, in the configuration of the fitting structure 201, engagement holes 254 are formed instead of engagement protrusions in a resin clip 241 serving as the cover-side first member and that engagement protrusions 246 are formed instead of engagement holes on a metal clip 250 serving as the cover-side second member.

More specifically, the resin clip 241 has engagement holes 254 that are formed substantially at the center of side surface portions 243. Each of the engagement holes 254 is formed to have such a size that there is a gap between the engagement hole 254 and a corresponding one of the engagement protrusions 246 of the metal clip 250 in a state where the engagement protrusion 246 is inserted in the engagement hole 254. In addition, beads 245 of the side surface portions 243 are each formed at a forward or backward position with respect to a corresponding one of the engagement holes 254.

In the metal clip 250, the engagement protrusions 246 are formed on upper piece portions 253 of side plate portions 252. Each of the engagement protrusions 246 has a protruding inclined surface 247 formed on the inner side thereof. The protruding inclined surface 247 is inclined toward the inner side from the upper side toward the lower side thereof. Note that the rest of the configuration is the same as that of the fitting structure 1.

As illustrated in FIG. 9, differences between the configuration of the fitting structure 301 according to the fourth embodiment and the configuration of the fitting structure 1 (see FIG. 2) are that, in the configuration of the fitting structure 301, a resin clip 341 serving as the cover-side first member has engagement holes 354 instead of engagement protrusions and does not include control protrusions and that, in contrast, a metal clip 350 serving as the cover-side second member includes engagement protrusions 346 instead of engagement holes and includes control protrusions 348.

More specifically, the resin clip 341 has engagement holes 354 that are formed substantially at the center of side surface portions 343. Each of the engagement holes 354 is formed to have such a size that there is a gap between the engagement hole 354 and a corresponding one of the engagement protrusions 346 of the metal clip 350 in a state where the engagement protrusion 346 is inserted in the engagement hole 354. Outer edges 355 are formed at the two ends of the side surface portions 343 in the forward and backward directions. In addition, beads 345 of the side surface portions 343 are each formed at a forward or backward position with respect to a corresponding one of the engagement holes 354.

In the metal clip 350, side plate portions 352 are each formed in a substantially quadrangular shape when viewed in the transverse direction. Control protrusions 348 are formed on upper end portions of the side plate portions 352 in the forward and backward directions. Each of the control protrusions 348 protrudes toward the side on which the control protrusion 348 faces one of the other control protrusions 348. In addition, the engagement protrusions 346 are formed on upper piece portions 353 of the side plate portions 352. Each of the engagement protrusions 346 has a protruding inclined surface 347 formed on the inner side thereof. The protruding inclined surface 347 is inclined toward the inner side from the upper side toward the lower side thereof. In a state where the metal clip 350 and the resin clip 341 are engaged with each other, there is a gap between each of the control protrusions 348 of the metal clip 350 and a corresponding one of the outer edges 355 of the resin clip 341. Note that the rest of the configuration is the same as that of the fitting structure 1.

As illustrated in FIG. 10, differences between the configuration of the fitting structure 401 according to the fifth embodiment and the configuration of the fitting structure 1 (see FIG. 2) are that, in the configuration of the fitting structure 401, a resin clip 441 serving as the cover-side first member does not include control protrusions and that a metal clip 450 serving as the cover-side second member includes control protrusions 448.

More specifically, in the resin clip 441, outer edges 455 are formed at the two ends of side surface portions 443 in the forward and backward directions. In the metal clip 450, side plate portions 452 are each formed in a substantially quadrangular shape when viewed in the transverse direction. Engagement holes 454 are formed in upper piece portions 453 of the side plate portions 452. Control protrusions 448 are formed on upper end portions of the side plate portions 452 in the forward and backward directions. Each of the control protrusions 448 protrudes toward the side on which the control protrusion 448 faces one of the other control protrusions 448. In a state where the metal clip 450 and the resin clip 441 are engaged with each other, there is a gap between each of the control protrusions 448 of the metal clip 450 and a corresponding one of the outer edges 455 of the resin clip 441. Note that the rest of the configuration is the same as that of the fitting structure 1.

The fitting structures 101, 201, 301, and 401, which have been described above, can also obtain advantageous effects similar to those of the fitting structure 1.

Although the embodiments of the present invention have been described in detail above, the present invention is not limited to the above-described embodiments. Various design changes can be made to the present invention within the scope of the present invention. Although the present invention may be mainly applied to seats of automobiles, the present invention may also be applied to, for example, seats of vehicles, such as railroad cars, aircrafts, and ships, and seats of indoor facilities, such as movie theaters and multipurpose halls.

What is claimed is:
1. A seat-cover fitting structure comprising:
   a main-body-side member that is embedded in a seat main body;
   a cover-side first member that is attached to a connecting member, the connecting member being included in a seat cover in order to fit the seat cover onto the seat main body; and
   a cover-side second member that is fitted to an exterior of the cover-side first member,
   wherein the main-body-side member and the cover-side second member are stuck to each other by magnetic force,
   wherein the cover-side first member and the cover-side second member are engaged with each other with a gap formed between the cover-side first member and the cover-side second member, and
   wherein the cover-side first member is a clip that engages the cover-side second member.
2. The seat-cover fitting structure according to claim 1, wherein an engagement protrusion is formed on one of the cover-side first member and the cover-side second member, and an engagement hole is formed in another one of the cover-side first member and the cover-side second member, the engagement hole having such a size that there is a gap between the engagement hole and the engagement protrusion in a state where the engagement protrusion is inserted in the engagement hole.
3. The seat-cover fitting structure according to claim 2, wherein a control protrusion is formed on one of the cover-side first member and the cover-side second member, the control protrusion being brought into contact with an outer edge of another one of the cover-side first member and the cover-side second member in a state where the engagement protrusion is inserted in the engagement hole and is leaning to one side.
4. The seat-cover fitting structure according to claim 3, wherein the cover-side first member also engages an end member attached to an end of the connecting member.

5. The seat-cover fitting structure according to claim 4, wherein an engagement portion is formed between the end member and the clip.
6. The seat-cover fitting structure according to claim 2, wherein the cover-side first member also engages an end member attached to an end of the connecting member.
7. The seat-cover fitting structure according to claim 6, wherein an engagement portion is formed between the end member and the clip.
8. The seat-cover fitting structure according to claim 1, wherein the cover-side first member also engages an end member attached to an end of the connecting member.
9. The seat-cover fitting structure according to claim 8, wherein an engagement portion is formed between the end member and the clip.
10. The seat-cover fitting structure according to claim 1, wherein the cover-side first member is made of a resin, and
wherein the cover-side second member is made of a metal.
11. The seat-cover fitting structure according to claim 1, wherein the main-body-side member includes a magnetic member and a bracket that engages the magnetic member, and
wherein the bracket includes a guide portion formed in order to guide the main-body-side member to a to-be-mounted portion that is included in a forming mold of the seat main body and on which the main-body-side member is to be mounted.
12. The seat-cover fitting structure according to claim 11, wherein the bracket includes a to-be-fitted portion into which the magnetic member is fitted in an entire-length direction of the bracket.
13. The seat-cover fitting structure according to claim 1, wherein a fixing hole that is secured to the seat main body and a fixing protrusion that is secured to the seat main body are formed in and on the main-body-side member.

* * * * *